(12) United States Patent
Gao et al.

(10) Patent No.: US 11,802,504 B2
(45) Date of Patent: Oct. 31, 2023

(54) VEHICLE SIDE RAIL, ELECTRIC TRANSMISSION SYSTEM, POWERTRAIN ASSEMBLY AND CORRESPONDING VEHICLE

(71) Applicant: Ford Global Technologies, LLC, Dearborn, MI (US)

(72) Inventors: Fei Gao, Anhui (CN); Bin Yin, Nanjing (CN); Larry Wang, Jiangsu (CN); Peng Fei He, Nanjing (CN)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/979,349

(22) Filed: Nov. 2, 2022

(65) Prior Publication Data

US 2023/0184156 A1 Jun. 15, 2023

(30) Foreign Application Priority Data

Dec. 14, 2021 (CN) .......................... 202111523933.5

(51) Int. Cl.
| | |
|---|---|
| *F01P 5/10* | (2006.01) |
| *B60L 50/64* | (2019.01) |
| *H01M 10/625* | (2014.01) |
| *H01M 50/204* | (2021.01) |
| *H01M 10/613* | (2014.01) |

(52) U.S. Cl.
CPC ................. *F01P 5/10* (2013.01); *B60L 50/64* (2019.02); *H01M 10/613* (2015.04); *H01M 10/625* (2015.04); *H01M 50/204* (2021.01); *B60L 2240/545* (2013.01)

(58) Field of Classification Search
CPC ....... F01P 5/10; B60L 50/64; B60L 2240/545; H01M 10/613; H01M 10/625; H01M 50/204
See application file for complete search history.

(56) References Cited

U.S. PATENT DOCUMENTS

| | | |
|---|---|---|
| 9,859,593 B2 | 1/2018 | Herntier et al. |
| 2016/0368415 A1* | 12/2016 | Shiwa ...................... B60Q 1/44 |
| 2019/0036181 A1* | 1/2019 | Tokozakura ...... H01M 10/6568 |
| 2020/0067156 A1 | 2/2020 | Chi et al. |
| 2020/0180417 A1 | 6/2020 | Marquez Duran et al. |
| 2020/0251698 A1* | 8/2020 | Paramasivam ..... H01M 10/613 |
| 2021/0119282 A1 | 4/2021 | Wunsche et al. |

FOREIGN PATENT DOCUMENTS

| | | | | |
|---|---|---|---|---|
| DE | 102018119545 A1 | | 2/2020 | |
| FR | 3027441 A1 | * | 4/2016 | ........... G10K 11/162 |

* cited by examiner

*Primary Examiner* — Jacob M Amick
*Assistant Examiner* — Charles J Brauch
(74) *Attorney, Agent, or Firm* — David B. Kelley; Carlson, Gaskey & Olds, P.C.

(57) ABSTRACT

The present disclosure provides a vehicle side rail, an electric transmission system, a powertrain assembly and a corresponding vehicle. The vehicle side rail according to the present disclosure includes a profile body that further comprises a housing and a conduit disposed in the housing, wherein the conduit connects a coolant pump and an electric transmission cooling system and transmits coolant between them.

18 Claims, 6 Drawing Sheets

VEHICLE SIDE RAIL, ELECTRIC TRANSMISSION SYSTEM, POWERTRAIN ASSEMBLY AND CORRESPONDING VEHICLE

RELATED APPLICATION(S)

This application claims priority to Chinese Patent Application No. 2021115239335, filed Dec. 14, 2021, the entirety of which is herein incorporated by reference.

TECHNICAL FIELD

The present disclosure generally relates to the field of vehicles, and more specifically, to a vehicle side rail, an electric transmission system, a powertrain assembly and a corresponding vehicle.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

SUMMARY

In some aspects, the techniques described herein relate to a vehicle side rail, including: a housing; and a conduit disposed in the housing, wherein the conduit fluidly couples a coolant pump and an electric transmission cooling system.

In some aspects, the techniques described herein relate to a vehicle side rail, wherein the conduit includes an inlet pipe for delivering coolant to the electric transmission cooling system and an outlet pipe for receiving coolant from the electric transmission cooling system.

In some aspects, the techniques described herein relate to a vehicle side rail, wherein the inlet pipe and the outlet pipe are connected to an inner side of the housing through connecting ribs.

In some aspects, the techniques described herein relate to a vehicle side rail, wherein the housing includes energy absorbing features outboard of the conduit.

In some aspects, the techniques described herein relate to a vehicle side rail, wherein the energy absorbing features are located between a body fixing bushing and the conduit.

In some aspects, the techniques described herein relate to a vehicle side rail, wherein the energy absorbing features include recesses formed in a side of the housing.

In some aspects, the techniques described herein relate to a vehicle side rail, wherein the housing further includes an elongated groove configured to accommodate a brake fluid pipeline or a high-pressure harness.

In some aspects, the techniques described herein relate to a vehicle side rail, further including a second housing having an elongated groove, wherein the elongated groove is configured to accommodate a brake fluid pipeline or a high-voltage harness.

In some aspects, the techniques described herein relate to a vehicle side rail, wherein the second housing includes energy absorbing features located outboard of the elongated groove.

In some aspects, the techniques described herein relate to a vehicle side rail, wherein the housing and the second housing are located at laterally opposite sides of the vehicle.

In some aspects, the techniques described herein relate to a vehicle side rail, further including liquid tight joints, wherein the conduit is connected to the coolant pump and the electric transmission cooling system through the liquid tight joints.

In some aspects, the techniques described herein relate to a vehicle side rail, wherein the housing and the conduit are integrally formed.

In some aspects, the techniques described herein relate to a vehicle side rail, wherein the housing also includes a riser configured to separate the conduit from a battery pack cooling system of the vehicle.

In some aspects, the techniques described herein relate to an electric transmission system for a vehicle, including: a coolant pump; an electric transmission cooling system; and a vehicle side rail including a housing and a conduit disposed in the housing, the conduit fluidly couples the coolant pump and the electric transmission cooling system.

In some aspects, the techniques described herein relate to an electric transmission system, wherein the conduit includes an inlet pipe for delivering coolant to the electric transmission cooling system and an outlet pipe for receiving coolant from the electric transmission cooling system.

In some aspects, the techniques described herein relate to an electric transmission system, wherein the housing includes energy absorbing features located outboard of the conduit.

In some aspects, the techniques described herein relate to an electric transmission system, wherein the vehicle side rail further includes a second housing including an elongated groove, and wherein the elongated groove is configured to accommodate a brake fluid pipeline or a high-voltage harness.

In some aspects, the techniques described herein relate to an electric transmission system, wherein the second housing includes energy absorbing features located outboard direction of the elongated groove.

BRIEF DESCRIPTION OF THE DRAWINGS

For a better understanding of the present disclosure, reference may be made to embodiments shown in the following drawings. The components in the drawings are not necessarily to scale and related elements may be omitted, or in some instances proportions may have been exaggerated. In addition, system components can be variously arranged, as known in the art. Further in the figures, like reference numbers refer to like parts throughout the different figures, unless otherwise noted.

DETAILED DESCRIPTION

Figure 1:
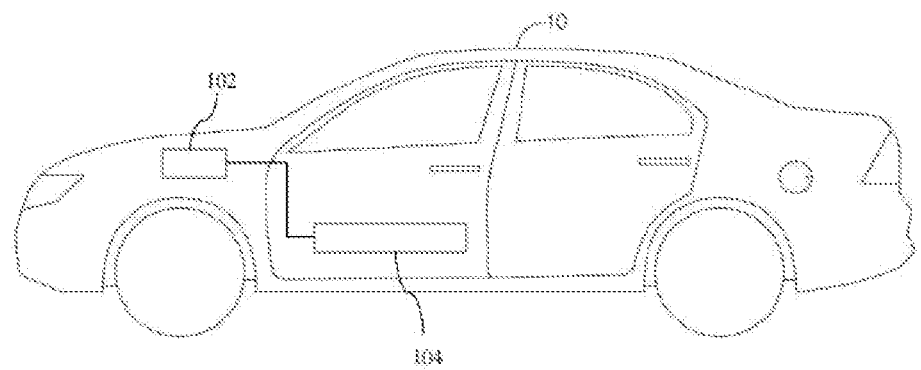
FIG. 1 shows a schematic diagram of an electrified vehicle to which one or more embodiments of the present disclosure are applied.

Embodiments of the present disclosure are described below. However, it is to be understood that the disclosed embodiments are merely examples and other embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure. As will be understood by those of ordinary skill in the art, various features shown and described with reference to any one figure may be combined with features shown in one or more other figures to produce embodiments not expressly shown or described. The combinations of features shown herein provide representative embodiments for typical disclosures. However, various combinations and modifications of the features consistent with the teachings of the present disclosure may be desired for certain particular applications or implementations.

In this document, when an element or part is referred to as being "on . . . ", "joined to", "connected to", or "coupled to" another element or part, the element or part can be directly on another element or part, can be joined, connected or coupled to another element or part, or there may be intervening elements or parts. In contrast, when an element is referred to as being "directly on . . . ", "directly joined to", "directly connected to", or "directly coupled to" another element or part, the intervening elements or parts may not be present. Other words used to describe the relationship between elements should be interpreted in a like fashion.

The present disclosure summarizes aspects of the embodiments and should not be used to limit the claims. Other implementations are contemplated in accordance with the techniques described herein, as will be apparent to those skilled in the art upon examination of the following drawings and detailed description, and such implementations are intended to be within the scope of this application.

The disclosed vehicle side rail, electric transmission system, powertrain assembly and corresponding vehicle releases more space for the vehicle battery to increase the driving mileage, while optimizing the heat dissipation of the electric transmission system.

According to an aspect of the disclosure, a vehicle side rail is provided, that includes a profile body, the profile body comprises:
  a housing; and
  a conduit disposed in the housing,
    wherein, the conduit connects a coolant pump and an electric transmission cooling system and transmits coolant between them.

According to an embodiment of the present disclosure, the conduit comprises an inlet pipe for delivering coolant to the electric transmission cooling system and an outlet pipe for receiving coolant from the electric transmission cooling system.

According to an embodiment of the present disclosure, the inlet pipe and the outlet pipe are connected to each other and connected to an inner side of the housing through connecting ribs.

According to an embodiment of the present disclosure, the profile body comprises energy absorbing features located in a vehicle outboard direction of the conduit.

According to an embodiment of the present disclosure, the energy absorbing features are located between a body fixing bushing and the conduit.

According to an embodiment of the present disclosure, the energy absorbing features comprise a pair of recesses formed on an upper side and a lower side of the housing respectively.

According to an embodiment of the present disclosure, the housing further has an elongated groove configured to accommodate brake fluid pipeline/high-pressure harness.

According to an embodiment of the present disclosure, the vehicle side rail further includes a second profile body, the second profile body comprises:
  a second housing having an elongated groove, wherein, the elongated groove is configured to accommodate brake fluid pipeline/high-voltage harness.

According to an embodiment of the present disclosure, the second profile body comprises energy absorbing features located in a vehicle outboard direction of the elongated groove.

According to an embodiment of the present disclosure, the profile body and the second profile body are respectively located at lateral sides of the vehicle.

According to an embodiment of the present disclosure, the vehicle side rail further includes liquid tight joints, and the conduit is connected to the coolant pump and the electric transmission cooling system respectively through the liquid tight joints.

According to an embodiment of the present disclosure, the housing and the conduit are integrally formed.

According to an embodiment of the present disclosure, the profile body also comprises a riser configured to separate the conduit from a battery pack cooling system of the vehicle.

According to another aspect of the present disclosure, an electric transmission system for a vehicle is provided, that comprises:
  a coolant pump;
  an electric transmission cooling system; and
  a vehicle side rail including a profile body, the profile body has a housing and a conduit disposed in the housing, the conduit connects the coolant pump and the electric transmission cooling system and transmits coolant between them.

According to an embodiment of the present disclosure, the conduit comprises an inlet pipe for delivering coolant to the electric transmission cooling system and an outlet pipe for receiving coolant from the electric transmission cooling system.

According to an embodiment of the present disclosure, the profile body comprises energy absorbing features located in a vehicle outboard direction of the conduit.

According to an embodiment of the present disclosure, the vehicle side rail further includes a second profile body, and the second profile body comprises:
- a second housing comprising an elongated groove,
  wherein, the elongated groove is configured to accommodate brake fluid pipeline/high-voltage harness.

According to an embodiment of the present disclosure, the second profile body comprises energy absorbing features located in a vehicle outboard direction of the elongated groove, and the profile body and the second profile body are respectively located at lateral sides of the vehicle.

According to yet another aspect of the present disclosure, a powertrain assembly for a vehicle is provided, that comprises:
- a battery pack;
- a first cooling system at least partially located within the battery pack and configured to cool the battery pack; and
- an electric transmission system electrically connected with the battery pack, the electric transmission system comprises:
  - a second cooling system configured to cool the electric transmission system;
  - a side rail arranged on sides of the battery pack, the side rail includes a profile body extending along a length direction of the side of the battery pack, the profile body has a housing and a conduit disposed in the housing, the conduit is configured to transmit coolant to the second cooling system,
- wherein, the second cooling system and the first cooling system are separated from each other by a side wall of the battery pack and the side rail, and the first cooling system and the second cooling system are not in fluid communication.

According to yet another aspect of the present disclosure, a vehicle including a vehicle side rail as described in any of the above embodiments is provided.

As mentioned in the background above, this disclosure releases more space to increase the battery volume and further increases the driving mileage by simply changing local structure without reducing the performance. For example, local adjustments to the structure of vehicle side rail and electric transmission system provide more vehicle body space and optimize the heat dissipation of the electric transmission system.

FIG. 1 depicts a block diagram of an electrified vehicle 10 to which one or more embodiments of the present disclosure are applied. In the context of the present disclosure, for example, the electrified vehicle 10 may include, but is not limited to, a plug-in hybrid electric vehicle (PHEV), a full hybrid electric vehicle (FHEV), a mild hybrid electric vehicle (MHEV) or a battery electric vehicle (BEV), etc. In the context of the present disclosure, as shown in the figure, the electrified vehicle 10 can include an electric transmission system 102 and a battery pack 104, wherein the battery pack 104 is electrically connected to the electric transmission system 102 and supplies energy for the electric transmission system 102, thereby driving the electrified vehicle 10 and various related functions. In some embodiments, the electric transmission system 102 of the electrified vehicle 10 includes a driving motor and its control system, and is a component that convert electrical energy into mechanical energy to drive the vehicle. The task of the electric transmission system 102 is to efficiently convert the energy of the vehicle battery pack 104 into kinetic energy of wheels under the control of driver, or convert kinetic energy feedback on the wheels into the vehicle battery pack 104, so as to realize the mutual conversion between electrical energy and mechanical energy.

Generally, the vehicle 10 includes a pair of side rails 110 in the form of vehicle body reinforcements, which are individually located on left and right sides of the vehicle body. The side rails 110 extend from a front side of the vehicle body to a rear side of the vehicle body, passing under the interior of the compartment. At the front of the interior of the compartment, the left and right side rails 110 are joined to a cross member and a front bulkhead, which cross the vehicle body in a transverse direction.

For the above-mentioned technical problems, according to an aspect of the present disclosure, views of the vehicle side rail 110 according to one or more embodiments of the present disclosure from various angles is shown in FIGS. 2 to 10. As shown in the figures, the vehicle side rail 110 comprises a profile body 112, and the profile body 112 further comprises a housing 116 and a conduit 118.

Figure 2:
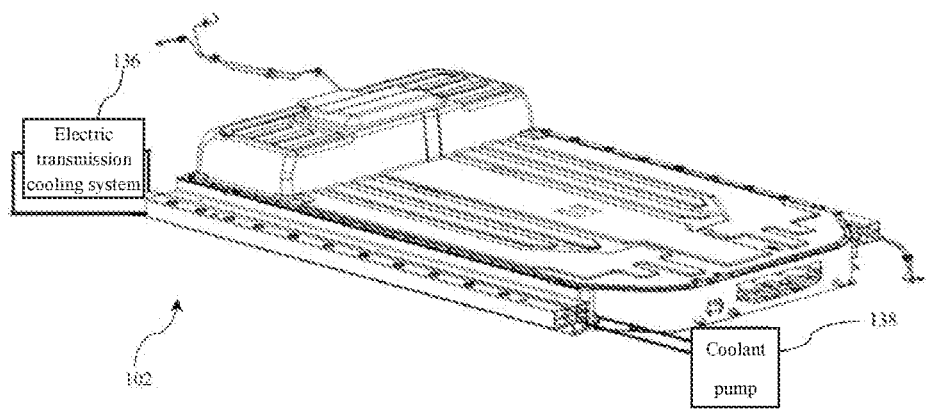
FIG. 2 shows a schematic diagram of a vehicle side rail and an electric transmission system according to one or more embodiments of the present disclosure.

The conduit 118 is arranged in the housing 116, wherein the conduit 118 connects a coolant pump 138 and an electric transmission cooling system 136 and transmits coolant between them, as shown in FIG. 2. In other words, the conduit 118 fluidly couples the coolant pump 138 and the electric transmission cooling system 136. In some embodiments of the present disclosure, the conduit 118 may include an inlet pipe 120 that transfers coolant from the coolant pump 138 to the electric transmission cooling system 136 and an outlet pipe 122 that transfers coolant from the electric transmission cooling system 136 to the coolant pump 138. Both the inlet pipe 120 and the outlet pipe 122 are integrated into the interior of the vehicle side rail 110, which can release more vehicle interior space and dissipate more heat by means of the profile body 112 of the vehicle side rail 110.

Figure 9:
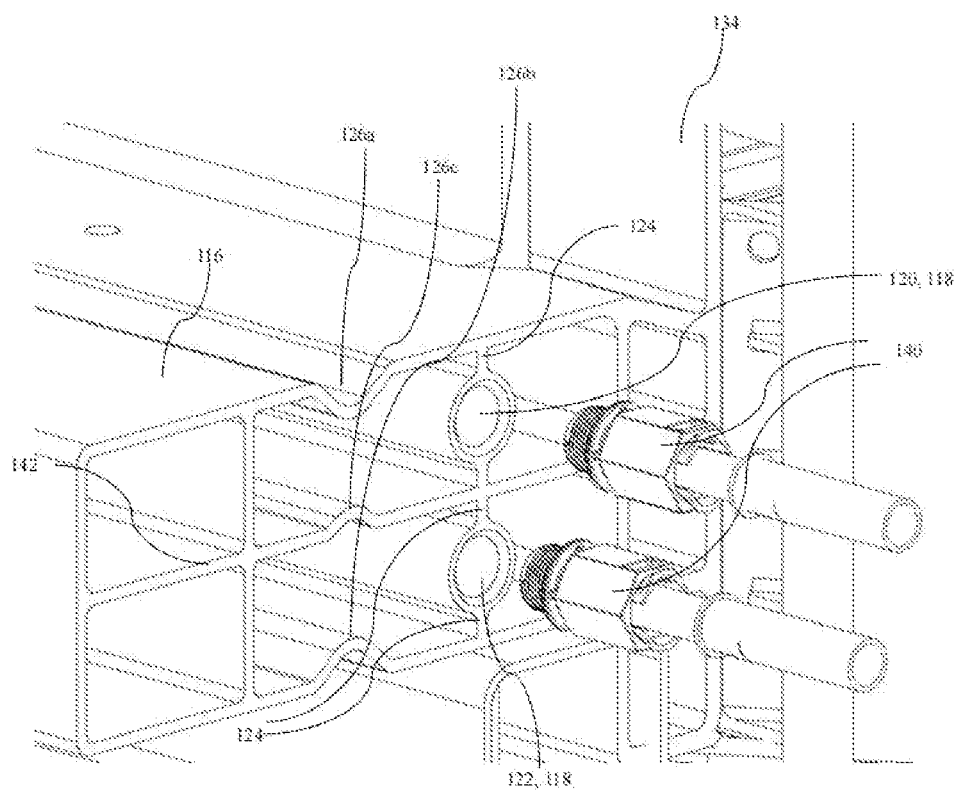
FIG. 9 shows a partially enlarged view of a profile body and liquid tight joints of a vehicle side rail according to one or more embodiments of the present disclosure.

As can be seen in FIG. 9, the housing 116 and the conduit 118 can be integrally formed components. For example, the profile body 112 may be an integral extrusion formed by, for example, extrusion processing, and different parts of the integral extrusion form the housing 116 and the conduit 118. This structure exhibits relatively high strength, and has an increased fixation effect on the conduit 118 in the housing 116. The processing of the profile body 112 is not limited to extrusion processing, but can also include, for example, casting, stamping, forging, and the like. In addition, it is understood that the materials of the profile body 112 may include, but are not limited to, various types of aluminum alloys, as well as various low carbon steels, medium carbon steels, high carbon steels, and any other metal or composite materials.

As further shown in FIG. 9, connecting ribs 124 can also be arranged in the housing 116 of the profile body 112. From the perspective of cross section, the connecting ribs 124 connect the inlet pipe 120 and the outlet pipe 122 and are connected to an inner side of the housing 116 to maintain the inlet pipe 120 and the outlet pipe 122 at fixed position in the housing 116 and strengthen the structure of the profile body 112. The connecting ribs 124 may extend along the entire longitudinal length of the profile body 112 or a portion thereof. In some other embodiments, the profile body 112 can also include a number of lateral support plates 142. The lateral support plates 142 can be connected to the inner side of the housing 116, and optionally to some connecting ribs 124, thereby further strengthening the structural strength of the profile body 112.

Figure 6:
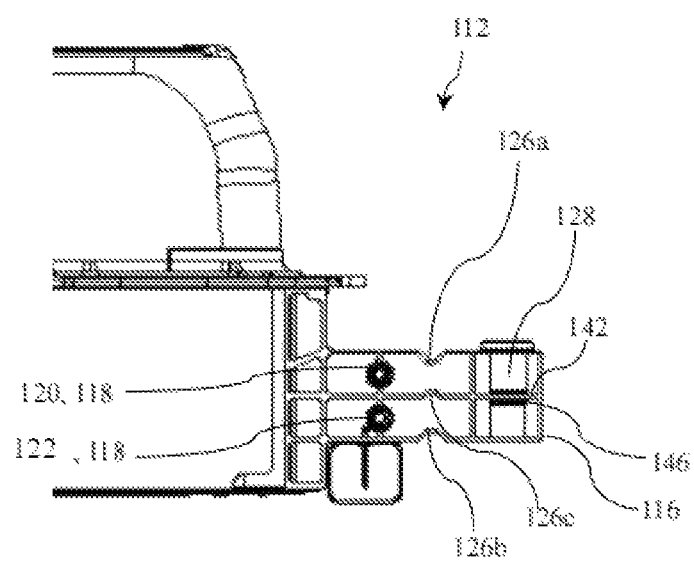
FIG. 6 shows an enlarged end view of a profile body of a vehicle side rail according to one or more embodiments of the present disclosure.
Figure 8:
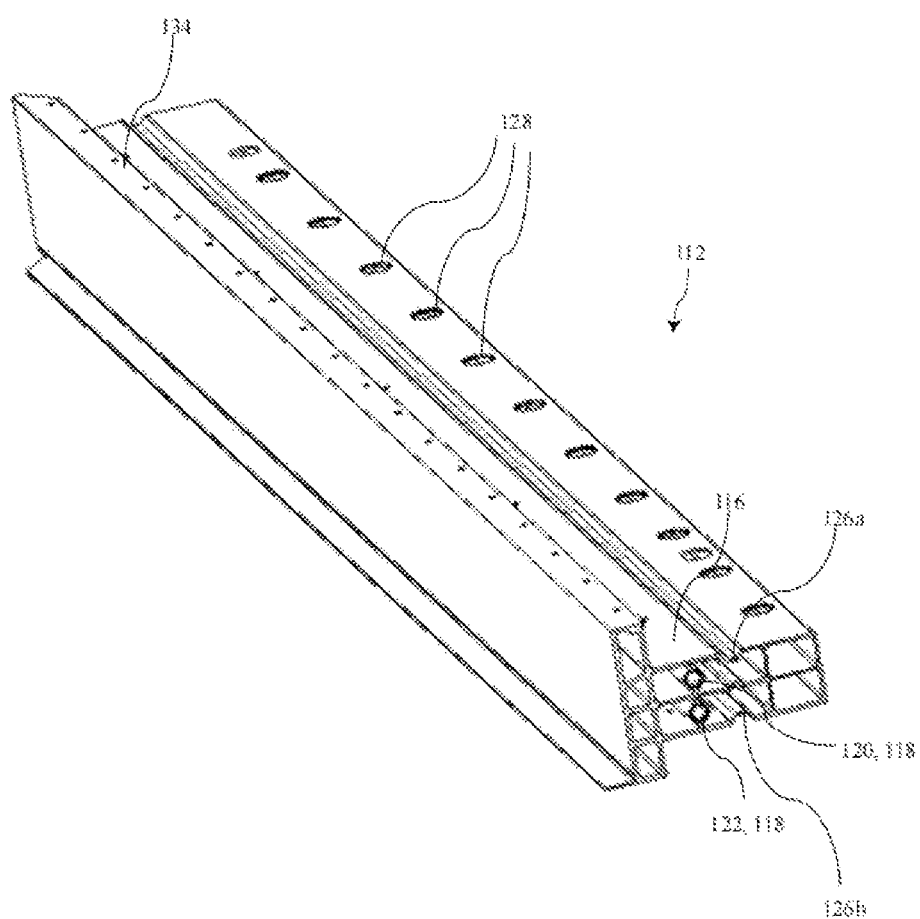
FIG. 8 shows a perspective view of a profile body of a vehicle side rail according to one or more embodiments of the present disclosure.

Referring to FIGS. 6, 8, and 9, in some embodiments, the profile body 112 can further include energy absorbing features 126a, b and c. The energy absorbing features 126a, b, c may be located in a vehicle lateral outboard direction of the conduit 118. The energy absorbing features 126a, b, c can absorb loads from the size relative to the conduit 118 and inner structures (such as the vehicle battery pack 104). The energy absorbing features 126a, b, c may include, for example, but are not limited to, various buffer structures, such as structures, honeycomb structures, and the like, arranged inside the profile body 112. According to one embodiment of the present disclosure, the energy absorbing features 126a, b, c include recesses formed on an upper and lower sides of the housing 116 of the profile body 112, respectively, such as grooves that extend along the entire longitudinal length of the profile body 112 or a portion thereof, as shown more clearly in FIGS. 6 and 9. In the figures, the upper and lower sides of the housing 116 form corresponding groove structures, which can further bend to absorb energy applied to the side of the vehicle 10. For example, the groove structures can be formed by extruding or stamping on the housing 116. It should be understood that the sectional shape of grooves (i.e., energy absorbing features 126a, b, c) is not limited to the semicircle shown in FIG. 9, but can also include various possible shapes such as square, triangle, trapezoid, etc. In the embodiment where the profile body 112 includes the lateral support plates 142, several energy absorbing features 126c can also be provided at the corresponding positions of the lateral support plates 142, such as the above grooved energy absorbing features, as shown in FIGS. 6 and 9. In several embodiments, referring to the end section view shown in FIG. 6 in detail, the energy absorbing feature 126a on the upper side of the housing 116 of the profile body 112 bends and protrudes downward, while the energy absorbing feature 126b on the lower side of the housing 116 of the profile body 112 and the energy absorbing feature 126c on the lateral support plate 142 bend and protrude upward, so that the outer part of the profile body 112 can bend and deflect downward in response to a load applied to a side of the vehicle.

Figure 5:
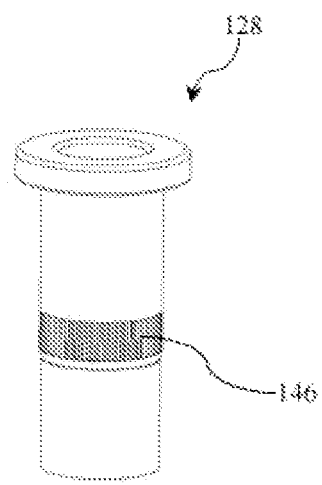
FIG. 5 shows an enlarged view of a body fixing bushing of a vehicle side rail according to one or more embodiments of the present disclosure.

The profile body 112 of the vehicle side rail 110 can normally be fixed to the body of the vehicle 10 by, for example, a body fixing bushing 128. Referring to FIG. 5, an enlarged view of the body fixing bushing 128 of the vehicle side rail 110 according to one or more embodiments of the present disclosure is shown. As shown in the figure, the body fixing bushing 128 can be in a cylindrical structure as a whole and can enter the vehicle side rail 110 through, for example, press riveting process, so that the structural strength of the vehicle side rail 110 will not be affected by further punching fixing bolts into the body fixing bushing 128 in the subsequent steps.

Further, in some embodiments of the present disclosure, the energy absorbing features 126a, b, c can be located between the body fixing bushing 128 and the conduit 118, as shown in FIGS. 6 and 8. Energy applied to a side of the vehicle is transferred from the vehicle body to the energy absorbing features 126a, b and c via the body fixing bushing 128 for buffering, so as to absorb loads relative to the conduit 118 and further inner structures (such as the vehicle battery pack 104). Referring to FIGS. 5 and 6, in some embodiments of the present disclosure, several positions on the body fixing bushing 128 can include friction fit structures 146, which can be closely combined with the lateral support plates 142 of the vehicle side rail 110 at the corresponding position through interference fit, so as to ensure the transmission and absorption of energy.

As shown in FIG. 9, the vehicle side rail 110 may also include liquid tight joints 140. According to some embodiments of the present disclosure, the conduit 118 (including the inlet pipe 120 and the outlet pipe 122) is connected to the coolant pump 138 and the electric transmission cooling system 136 through the liquid tight joints 140, respectively. The liquid tight joints 140 may include, for example, sealing structures such as liquid tight seal rings, and connection structures such as thread locking structures, to realize a fast liquid tight connection between the conduit 118 and the coolant pump 138 and the electric transmission cooling system 136, respectively. Therefore, the conduit 118 (including the inlet pipe 120 and the outlet pipe 122) in the side rail 110 is directly used to transfer the coolant without using and installing another liquid line. In contrast, this scheme does not need to fix the conduit 118 on the vehicle side rail 110 from front to rear.

Figure 11:
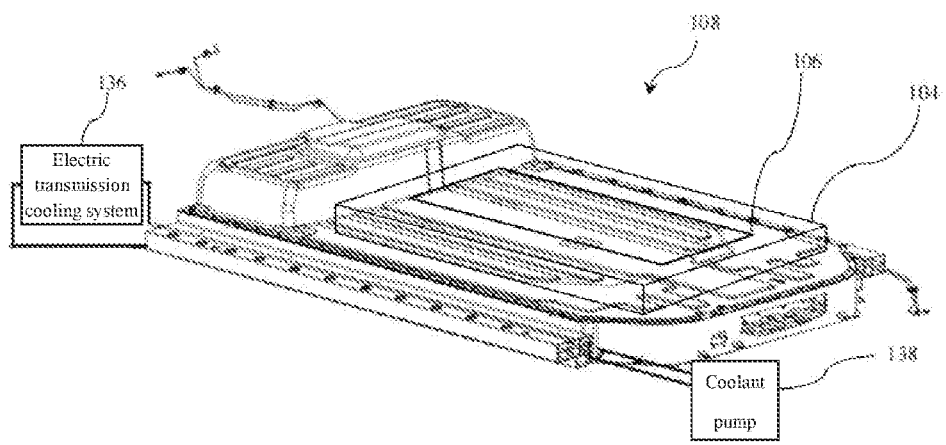
FIG. 11 shows a schematic diagram of a powertrain assembly according to one or more embodiments of the present disclosure.

Further referring to FIGS. 8, 9 and 11, the profile body 112 of the vehicle side rail 110 of the present disclosure can also include a riser 134 located between the conduit 118 and the battery pack cooling system 106 of the vehicle and separating them. The riser 134 may be located on a side of the housing 116 of the profile body 112 and protrude upward and downward on both sides. The riser 134 may extend along the entire longitudinal length of the profile body 112 or a portion thereof. In addition, the riser 134 also separates the conduit 118 of the vehicle side rail and the cooling pipe of the battery pack cooling system 106, so that they are kept in relatively independent spaces, which ensures the independent operation between the two.

Figure 10:
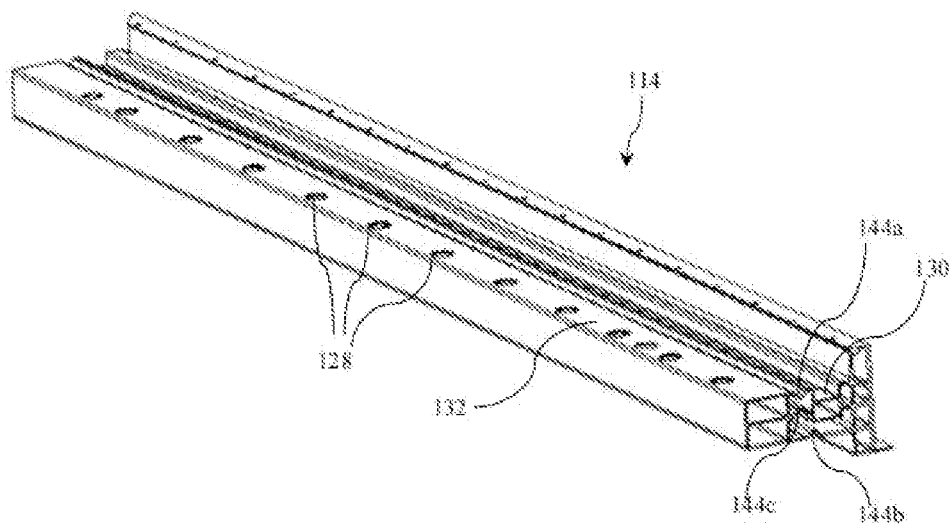
FIG. 10 shows a perspective view of a second profile body of a vehicle side rail according to one or more embodiments of the present disclosure.

The vehicle side rail 110 can also include a second profile body 114. According to several embodiments of the present disclosure, the second profile body 114 includes a second housing 132, and an elongated groove 130 is formed on the longitudinal length of the second housing 132, as shown in FIG. 10. The elongated groove 130 is configured to accommodate brake fluid pipeline or high-pressure wire harness, and can extend along the entire longitudinal length of the second profile body 114 or a portion thereof. As shown in the figure, the elongated groove 130 accommodates one of the brake fluid pipeline or high-pressure harnesses, the other one of the high-pressure harnesses or brake fluid pipeline can be at a different mounting height on the second profile body 114. For example, the other one can be at an upper side of the second housing 132 of the second profile body 114 or in a groove at different depths. This can provide better load absorption for brake fluid pipeline and high-pressure harnesses in response to side loads. In some further embodiments of the present disclosure, the elongated groove 130 is configured to accommodate the high-voltage harness, so as to provide better protection for high-voltage electrical circuit of the vehicle.

Figure 3:
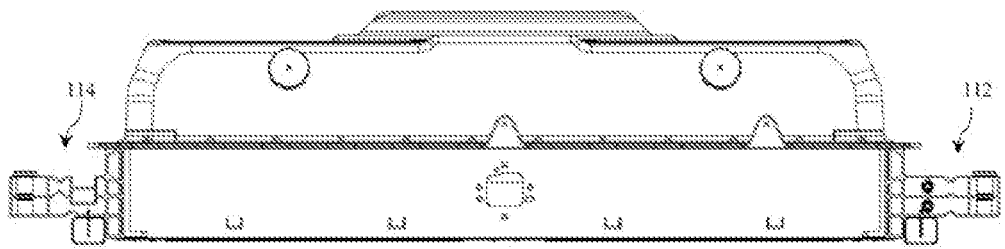
FIG. 3 shows an end view of a vehicle side rail according to one or more embodiments of the present disclosure.
Figure 4:
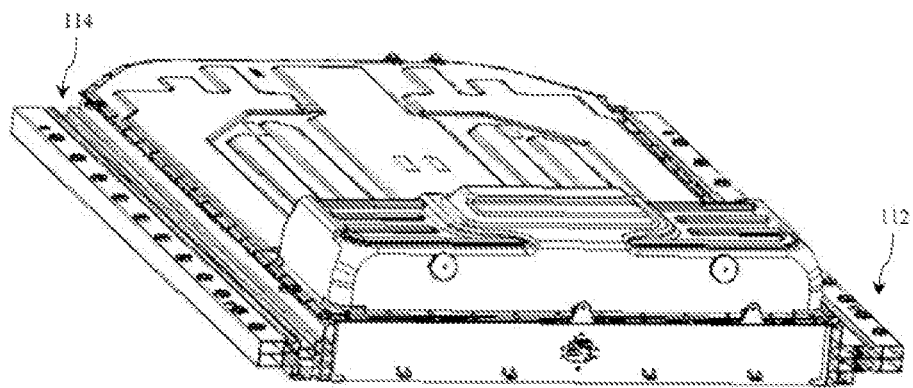
FIG. 4 shows a perspective view of a vehicle side rail according to one or more embodiments of the present disclosure.

Referring to FIGS. 3 and 4, according to an embodiment of the present disclosure, the profile body 112 and the second profile body 114 of the vehicle side rail 110 can be respectively located on lateral sides of the vehicle 10, such as the left and right sides in the driving direction, to further utilize the available space inside the vehicle side rail 110 and provide better protection.

Figure 7:
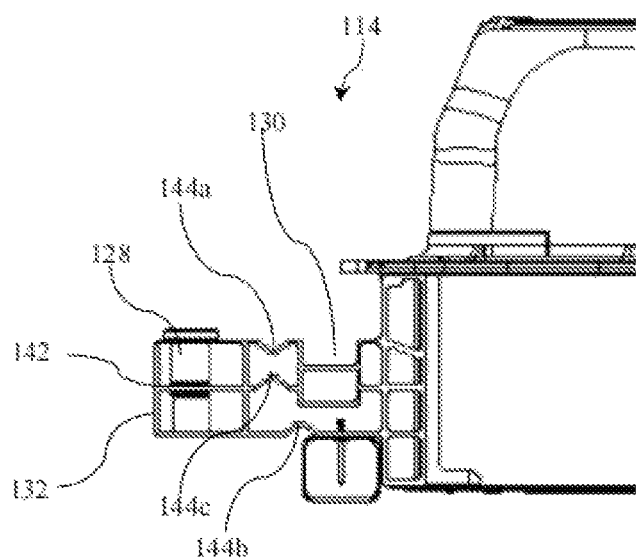
FIG. 7 shows an enlarged end view of a second profile body of a vehicle side rail according to one or more embodiments of the present disclosure.

The second profile body 114 may also include energy absorbing features 144a, b, c located in a vehicle outboard direction of the elongated groove 130, as shown in the embodiments of FIGS. 7 and 10. Similarly, the energy absorbing features 144a, b, c may include, for example, but are not limited to, various commonly used buffer structures, such as folding structures, honeycomb structures and the like arranged inside the second profile body 114 to protect the brake fluid pipeline or high-voltage wire harness and further inner structures (such as the vehicle battery pack 104). The energy absorbing features 144a, b and c can also include recesses formed on an upper and lower sides of the housing 132 of the second profile body 114, such as grooves that extend along the entire longitudinal length of the second profile body 114 or a portion thereof. The upper and lower sides of the housing 132 form corresponding groove structures, which can further bend to absorb energy when a load is applied to a side of the vehicle 10. For example, the groove structures can be formed by extruding or stamping on the housing 132. It should also be understood that the sectional shape of the groove structure (i.e., the energy absorbing features 144a, b, c) is not limited to the semicircle shown in FIG. 10, but can also include various possible shapes such as square, triangle, trapezoid, etc. In some further embodiments of the present disclosure, the energy absorbing features 144a, b, c can be located between the body fixing bushing 128 and the elongated groove 130, as shown in FIG. 7, to transfer the energy directly transferred from the body to the energy absorbing features 144a, b, c through the body fixing bushing 128 for buffering.

Referring to the end sectional view shown in FIG. 7 in detail, in several embodiments, the energy absorbing feature 144a on the upper side of the housing 132 of the second profile body 114 bends and protrudes downward, while the energy absorbing feature 144b on the lower side of the housing 132 and the energy absorbing feature 144c on the lateral support plates 142 bend and protrude upward, so as to provide effective energy absorption relative to the side of the vehicle. Further referring to FIGS. 7 and 10, according to several embodiments of the present disclosure, the energy absorbing feature 144b located on the lower side of the housing 132 of the second profile body 114 may not be laterally aligned with the energy absorbing feature 144a located on the upper side of the housing 132 and the energy absorbing feature 144c located on the lateral support plates 142, but laterally offset by a preset distance to one side of the elongated groove 130 such as being laterally offset by, for example, the length of one to a number of energy absorbing features 144, so that outer part of the second profile body 114 can further bend and deflect downward in response to a side load, thereby directing the load away from the structures in or adjacent the elongated groove 130.

In addition, according to several embodiments of the present disclosure, the housing 116 of the profile body 112 can have an elongated groove configured to accommodate brake fluid pipeline or high-pressure wire harness, that is, the elongated groove and the conduit 118 are located on the side rail 110 on the same side of the vehicle, which can further make full use of the internal space of the vehicle side rail 110, and reserve the internal space of the vehicle side rail 110 on the other side to other vehicle components. For example, part of the cooling pipes of the battery pack cooling system 106 of the battery pack 104 can be integrated into the interior space of the vehicle side rail 110 on the other side to ensure the isolation between the conduit 118 of the vehicle side rail and the cooling pipes of the battery pack cooling system 106.

According to another aspect of the present disclosure, an electric transmission system 102 for a vehicle is also provided. As shown in FIG. 2, the electric transmission system 102 includes a coolant pump 138, an electric transmission cooling system 136, and a vehicle side rail 110. The vehicle side rail 110 includes a profile body 112. The profile body 112 has a housing 116 and a conduit 118 arranged in the housing 116. The conduit 118 connects the coolant pump 138 and the electric transmission cooling system 136 and transmits coolant between them. It should be understood that all the embodiments, features and advantages described above for the vehicle side rail 110 according to the first aspect of the present disclosure are equally applicable to the electric transmission system 102 for the vehicle according to another aspect of the present disclosure without conflicting with each other. That is to say, all the embodiments described above and their variants can be directly transferred and applied combined with this. For the sake of brevity of this disclosure, it will not be repeated here.

According to another aspect of the present disclosure, a powertrain assembly 108 for a vehicle is also provided. Referring to FIGS. 1 and 11, the powertrain assembly 108 includes a battery pack 104, a first cooling system (i.e., a battery pack cooling system) 106, and an electric transmission system 102. The first cooling system 106 may be at least partially located within the battery pack 104 and configured to provide cooling for the battery pack 104. The electric transmission system 102 may be electrically connected to and driven by the battery pack 104. The electric transmission system 102 includes a second cooling system (that is, an electric transmission cooling system) 136 that provides cooling for itself, and a vehicle side rail 110. As shown in FIG. 11, the vehicle side rail 110 is arranged on a side of the battery pack 104, including a profile body 112 extending along the length direction of the side of the battery pack 104. The profile body 112 has a housing 116 and a conduit 118 arranged in the housing 116. The conduit 118 is configured to deliver coolant to the second cooling system 136. Wherein, the second cooling system 136 and the first cooling system 106 are separated from each other by a side wall of the battery pack and the side rail 110, and there is no fluid connection between the first cooling system 106 and the second cooling system 136. This can further ensure the independent operation between the two. Similarly, all other embodiments, features and advantages described above for the vehicle side rail 110 according to the present disclosure are equally applicable to the powertrain assembly 108 according to the present disclosure, and will not be repeated here.

According to yet another aspect of the present disclosure, a vehicle 10 is also provided, including a vehicle side rail 110 as described in any of the above embodiments, as shown in FIG. 1. Similarly, all embodiments, features and advantages described above for the vehicle side rail 110 according to the present disclosure are equally applicable to the vehicle 10 according to the present disclosure, and will not be repeated here.

It should be understood that, on the premise of technical feasibility, the technical features listed above for different embodiments can be combined with each other to form other embodiments within the scope of the present disclosure.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes,"

"including," and "include" are inclusive and have the same scope as "comprises," "comprising," and "comprise" respectively.

Directional terms such as "upward," "above," "downward," "under," "below," "side," "inside," "outside," "horizontal," etc., are used herein with reference to the normal operational attitude of a motor vehicle. It should be understood that terms such as "slightly," "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle side rail, comprising:
a housing; and
a conduit disposed in the housing,
wherein the conduit fluidly couples a coolant pump and an electric transmission cooling system, wherein the vehicle side rail is a vehicle body reinforcement located on a left or right side of a vehicle body, and wherein the vehicle side rail extends from a front side of the vehicle body to a rear side of the vehicle body.

2. The vehicle side rail as claimed in claim 1, wherein the conduit comprises an inlet pipe for delivering coolant to the electric transmission cooling system and an outlet pipe for receiving coolant from the electric transmission cooling system.

3. The vehicle side rail as claimed in claim 2, wherein the inlet pipe and the outlet pipe are connected to an inner side of the housing through connecting ribs.

4. The vehicle side rail as claimed in claim 1, wherein the housing comprises energy absorbing features outboard of the conduit.

5. A vehicle side rail, comprising:
a housing; and
a conduit disposed in the housing,
wherein the conduit fluidly couples a coolant pump and an electric transmission cooling system,
wherein the housing comprises energy absorbing features outboard of the conduit, and
wherein the energy absorbing features are located between a body fixing bushing and the conduit.

6. The vehicle side rail as claimed in claim 4, wherein the energy absorbing features comprise recesses formed in a side of the housing.

7. The vehicle side rail as claimed in claim 1, wherein the housing further includes an elongated groove configured to accommodate a brake fluid pipeline or a high-pressure harness.

8. The vehicle side rail as claimed in claim 1, further including a second housing having an elongated groove, wherein the elongated groove is configured to accommodate a brake fluid pipeline or a high-voltage harness.

9. The vehicle side rail as claimed in claim 8, wherein the second housing comprises energy absorbing features located outboard of the elongated groove.

10. The vehicle side rail as claimed in claim 8, wherein the housing and the second housing are located at laterally opposite sides of the vehicle.

11. The vehicle side rail as claimed in claim 1, further including liquid tight joints, wherein the conduit is connected to the coolant pump and the electric transmission cooling system through the liquid tight joints.

12. The vehicle side rail as claimed in claim 1, wherein the housing and the conduit are integrally formed.

13. The vehicle side rail as claimed in claim 1, wherein the housing also comprises a riser configured to separate the conduit from a battery pack cooling system of the vehicle.

14. An electric transmission system for a vehicle, comprising:
a coolant pump;
an electric transmission cooling system; and
a vehicle side rail including a housing and a conduit disposed in the housing, the conduit fluidly couples the coolant pump and the electric transmission cooling system, wherein the vehicle side rail is a vehicle body reinforcement located on a left or right side of a vehicle body, and wherein the vehicle side rail extends from a front side of the vehicle body to a rear side of the vehicle body.

15. The electric transmission system as claimed in claim 14, wherein the conduit comprises an inlet pipe for delivering coolant to the electric transmission cooling system and an outlet pipe for receiving coolant from the electric transmission cooling system.

16. The electric transmission system as claimed in claim 14, wherein the housing comprises energy absorbing features located outboard of the conduit.

17. The electric transmission system as claimed in claim 14, wherein the vehicle side rail further includes a second housing comprising an elongated groove, and wherein the elongated groove is configured to accommodate a brake fluid pipeline or a high-voltage harness.

18. The electric transmission system as claimed in claim 17, wherein the second housing comprises energy absorbing features located outboard direction of the elongated groove.

* * * * *